United States Patent
McLoone, Jr. et al.

(10) Patent No.: US 9,086,851 B2
(45) Date of Patent: Jul. 21, 2015

(54) CURVED KEY INPUT FORM FACTORS OF HANDHELD DEVICES

(75) Inventors: Hugh Edward McLoone, Jr., Bellevue, WA (US); Michael Kemery, Seattle, WA (US); Maura C. Collins, San Francisco, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 195 days.

(21) Appl. No.: 13/269,430

(22) Filed: Oct. 7, 2011

(65) Prior Publication Data

US 2013/0088433 A1    Apr. 11, 2013

(51) Int. Cl.
     *G09G 5/00*     (2006.01)
     *G06F 1/16*     (2006.01)
     *G06F 3/02*     (2006.01)
     *H04M 1/23*     (2006.01)

(52) U.S. Cl.
     CPC ............ *G06F 1/1662* (2013.01); *G06F 3/0202* (2013.01); *H04M 1/23* (2013.01)

(58) Field of Classification Search
None
See application file for complete search history.

(56) References Cited

U.S. PATENT DOCUMENTS

| | | |
|---|---|---|
| 5,941,648 A | 8/1999 | Robinson et al. |
| 6,802,662 B1 | 10/2004 | Cheng et al. |
| 6,919,879 B2 | 7/2005 | Griffin et al. |
| D540,335 S | 4/2007 | Downs et al. |
| D626,127 S | 10/2010 | Odell et al. |
| D626,961 S | 11/2010 | Prokop |
| 8,162,552 B2 * | 4/2012 | Rak et al. ........ 400/490 |
| 2007/0256915 A1 * | 11/2007 | Levy ............ 200/5 A |
| 2007/0268259 A1 * | 11/2007 | Griffin et al. ....... 345/169 |
| 2008/0138136 A1 | 6/2008 | Sauvage et al. |
| 2008/0291058 A1 * | 11/2008 | Park ............... 341/22 |
| 2009/0195509 A1 * | 8/2009 | Rak ............... 345/169 |
| 2010/0060604 A1 * | 3/2010 | Zwart et al. ....... 345/173 |
| 2012/0189368 A1 * | 7/2012 | Jawerth et al. ...... 400/489 |
| 2012/0196630 A1 * | 8/2012 | Kawalkar ......... 455/466 |
| 2012/0280913 A1 * | 11/2012 | Wang et al. ........ 345/169 |

OTHER PUBLICATIONS

Images of Blackberry Curve Keyboards, retrieved from <<http://www.bing.com/images/search?q=blackberry+curve+keyboard &FORM=BIFD#x0y14058>>, on Jun. 14, 2011, available as early as Jun. 1, 2011, 16 pgs.

"Nokia E63 Vs Nokia E71—Comparison and Differences," retrieved from <<http://qwertykeyboardphones.org/tag/nokia-e71>>, May 12-13, 2010, 4 pgs.

\* cited by examiner

*Primary Examiner* — Adam R Giesy
*Assistant Examiner* — Henok Heyi
(74) *Attorney, Agent, or Firm* — Lee & Hayes, PLLC

(57) ABSTRACT

Handheld devices are described herein with display portions and with key input portions having curved form factors. The key input portions have form factors that are concave or convex with respect to a plane formed by two edges of a surface of the display portion.

3 Claims, 10 Drawing Sheets

CURVED KEY INPUT FORM FACTORS OF HANDHELD DEVICES

BACKGROUND

A form factor is the physical size and shape of a device or of a component of a device. A key input form factor is the physical size and shape of a keyboard, for example. As handheld devices, such as cell phones, personal digital assistants (PDA), smart phones, etc., become increasingly popular for mobile communications and mobile data access, key input form factors for handheld devices must meet the physical biomechanics of the human users and must be adapted to accommodate the limited amount of space provided.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

The following description sets forth arrangements and techniques for curving key input form factors of handheld devices. The arrangements and techniques discussed herein occur at a manufacturing and production stage of handheld devices, prior to distribution of the handheld devices to retail consumers or enterprise workers. Curving the key input form factors of handheld devices improves the ease of use and provides users of the handheld device with a better and more comfortable key input experience.

Figure 1:
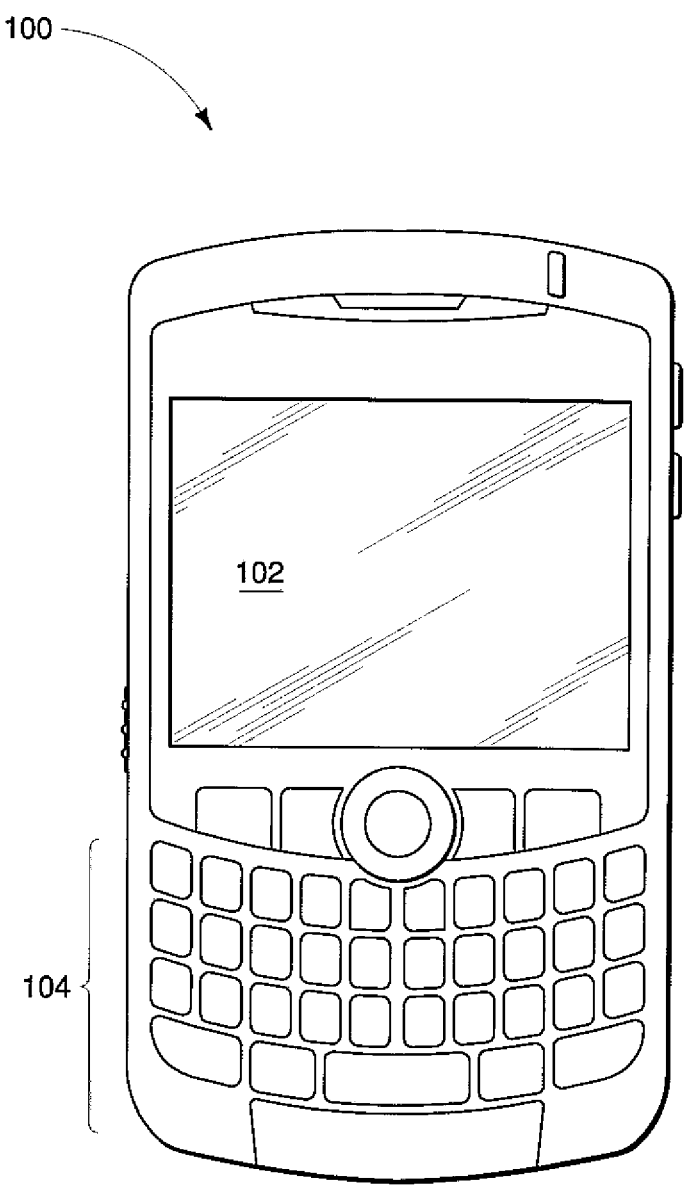
FIG. 1 illustrates an example handheld device, in accordance with various embodiments.

FIG. 1 illustrates an example handheld device 100. Handheld device 100 typically includes a display portion 102 and a key input portion 104. The display portion 102 and the key input portion 104 are commonly configured within the handheld device so that a user can provide input via the key input portion 104 while subsequently having the input displayed via the display portion 102. For example, when typing a text message using the handheld device 100, a user hits or presses keys in the key input portion 104, and then corresponding characters, numbers, and symbols are displayed via the display portion 102.

Figure 2A:
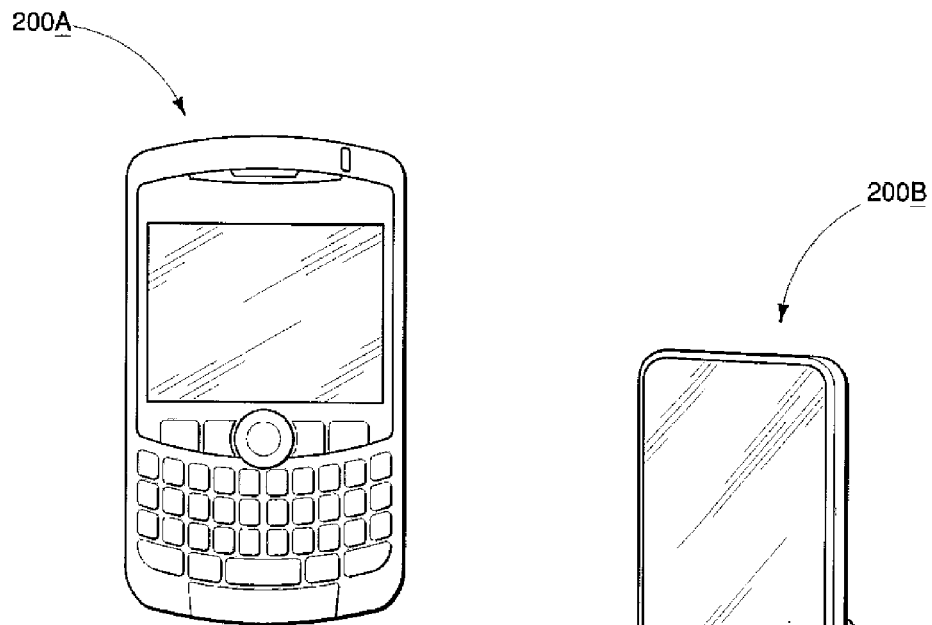
FIGS. 2A-2F illustrate different handheld device form factors, in accordance with various embodiments.
Figure 2B:
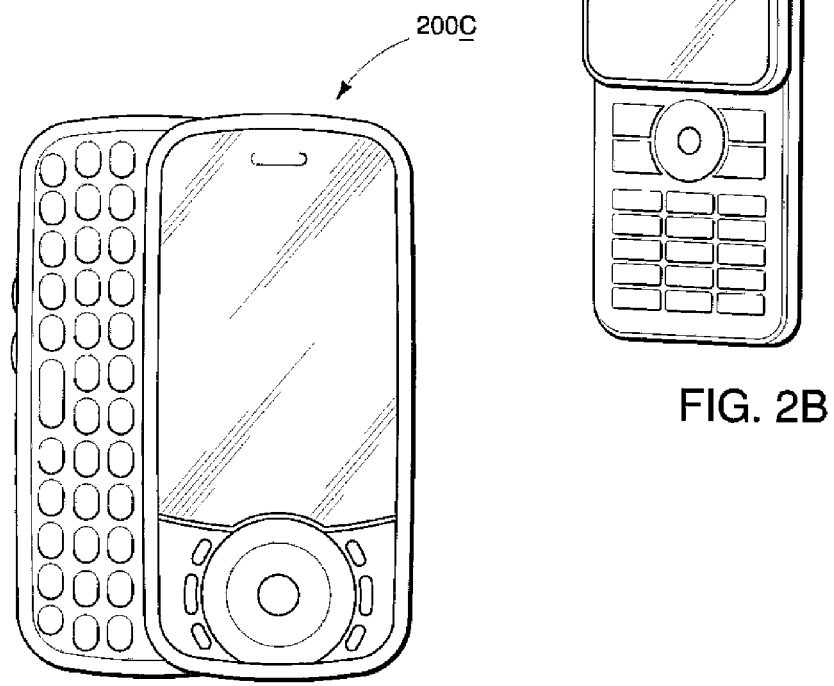
Figure 2C:
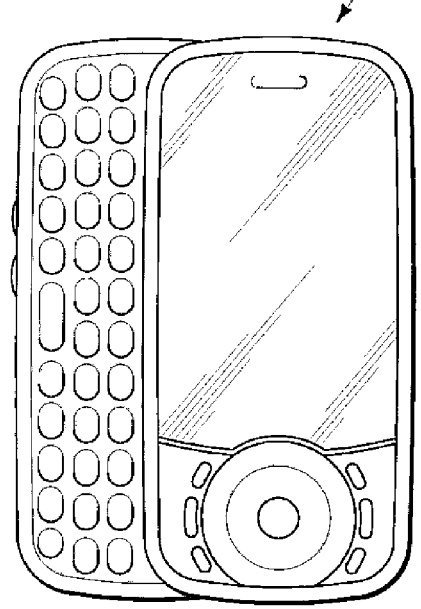
Figure 2D:
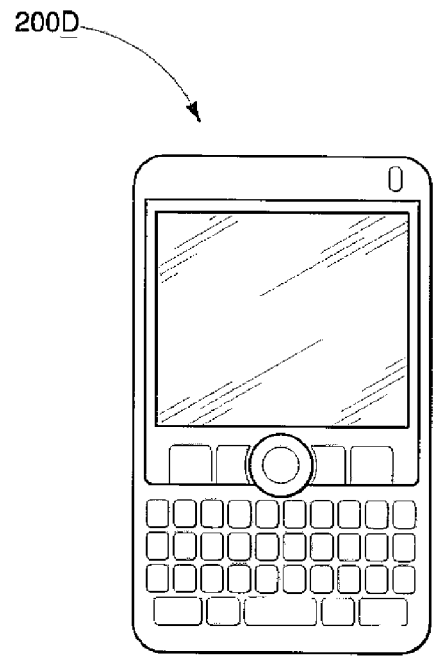
Figure 2E:
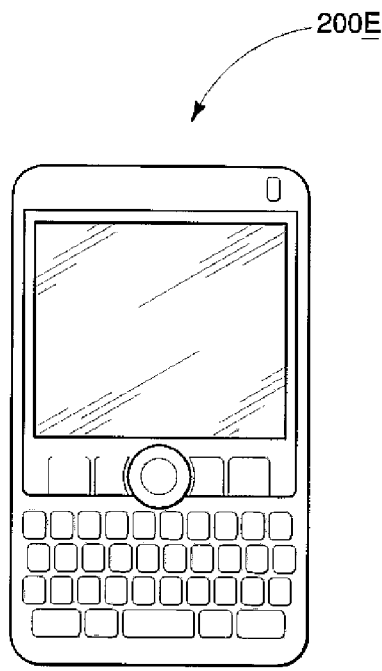
Figure 2F:
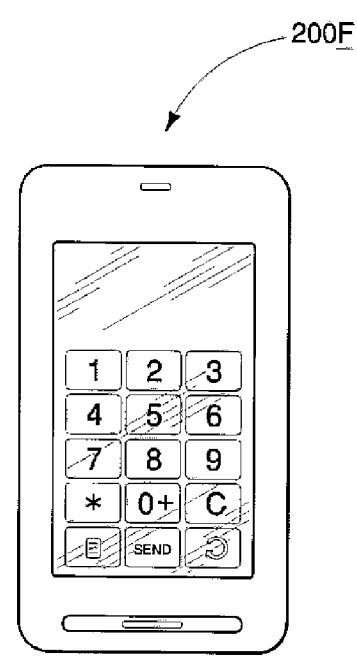

FIGS. 2A-2F illustrate example handheld devices on which the arrangements and techniques described herein may be implemented. The handheld device form factors illustrated in FIGS. 2A-2F are commonly known in the field of art. For example, FIG. 2A illustrates a "bar" handheld device 200A with a "smiley" straight columned keyboard and a portrait view. FIG. 2B illustrates a "slide" handheld device 200B with a straight columned digit keypad and a portrait view. FIG. 2C illustrates a "slide" handheld device 200C with a staggered columned keyboard and a landscape view (with respect to the keyboard). FIG. 2D illustrates a "bar" handheld device 200D with a straight row and straight columned keyboard and a portrait view. FIG. 2E illustrates a "bar" handheld device 200E with a straight row and staggered columned keyboard and a portrait view. FIG. 2F illustrates a touch screen "slate" form factor with the key input portion optionally displayable via the display portion. For touch screens, the key input portion may be a soft key pad where individual keys (i.e. numbers, letters, symbols) are displayed within the display portion in accordance with an orientation (i.e. portrait or landscape) of the handheld device.

It is noted that while FIGS. 2A-2F illustrate bar and slide handheld device form factors, it is understood in the context of this document, that the arrangements and techniques discussed herein may be applied to any handheld device form factor that contains a display portion 102 and a key input portion 104. These may further include, but are not limited to, a "flip" form factor, a "swivel" form factor, a "clamshell" form factor, and a "slate" form factor. Moreover, it is understood in the context of this document, that handheld devices on which the arrangements and techniques described herein may be implemented on, may include any combination and/or configuration of key placement (i.e. where individual keys are placed within the key input portion, such as a QWERTY keyboard), keyboard layout (e.g., staggered columns, straight columns, straight rows, different number of rows, different number of columns), display and keyboard view position (e.g., landscape, portrait, or a switching combination thereof), and type of keys (i.e. physical keys, soft keys for touch screen, or a combination thereof).

Accordingly, the arrangements and techniques discussed herein are independent of key placement, keyboard layout, and the display and keyboard viewing position. Moreover, the arrangements and techniques discussed herein relate to two-handed and/or one-handed use of handheld devices. For examples, users of handheld devices commonly employ one or both thumbs to provide key input. Thus, compared to conventional keyboards (i.e. full size desktop keyboards or laptop keyboards) where typical key input is provided by multiple digits on each hand (i.e. standard "home" row scheme), for handheld devices the thumb(s) is/are typically relied upon to cover multiple different motions and distances to provide input via the different keys in the key input portion 104. Further, a handheld device is mobile and not typically placed on a flat surface when key input occurs. Rather, a handheld device is typically being held in one or two hands when key input occurs. The key input is usually provided via side access to the handheld device while the handheld device is grasped by one or two hands of the user.

In various embodiments, the curved key input form factor is a concave curve. A concave curve is an inward curve. For instance, FIG. 3A illustrates a handheld device 300A where the key input portion 104 has a form factor that is concave.

The form factor is concave with respect to a plane formed by two edges of a surface of the display portion 102. As depicted in FIG. 3A, the two edges that form the plane may be the left and right edges of the display portion 102. Furthermore, FIG. 3A shows that the two edges may be linear and parallel to one another. However, in additional embodiments the two edges that form the plane may not be linear and/or parallel to one another.

Figure 3A:
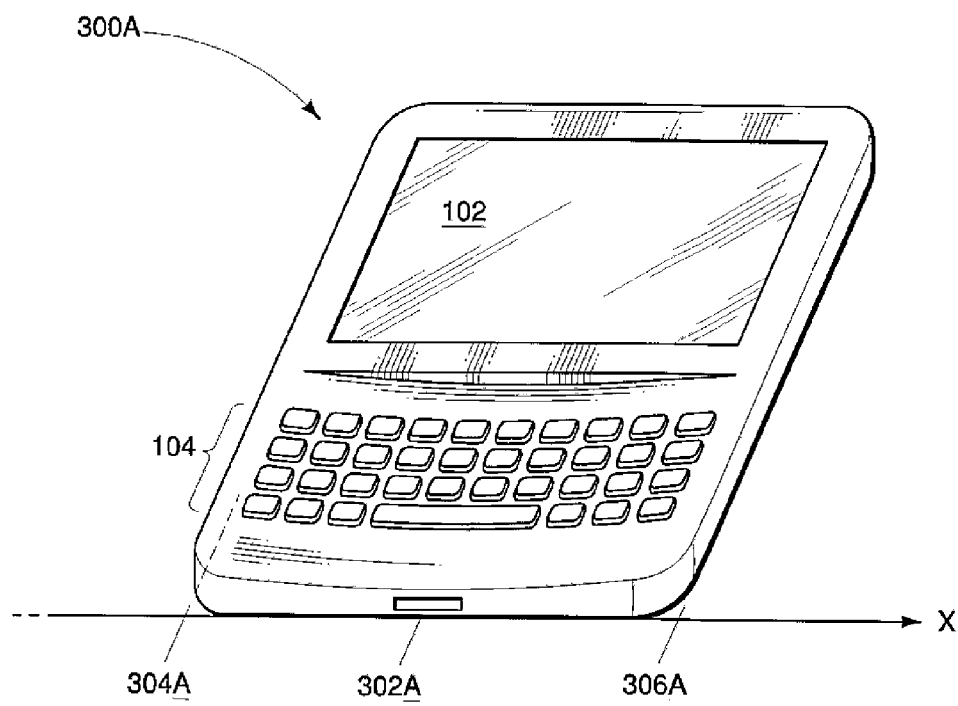
FIGS. 3A and 3B illustrate example handheld devices with key input form factors curved in a concave manner and a convex manner, in accordance with various embodiments.

In FIG. 3A, the surface of the display portion 102 remains flat or substantially flat. Accordingly, given the view of the handheld device 300A, the center 302A of the key input portion 104 in the x-direction is depressed in the z-direction with respect to the left edge 304A and the right edge 306A, which are elevated. By having the key input portion 104 curved in a concave manner, one or two user input digits (e.g., thumbs) are not required to travel as far of a distance to press different keys on the handheld device. Thus, one or two user input digits may access keys in a quicker and more efficient manner when texting, for example, compared to conventional flat key input form factors on handheld devices.

Figure 3B:
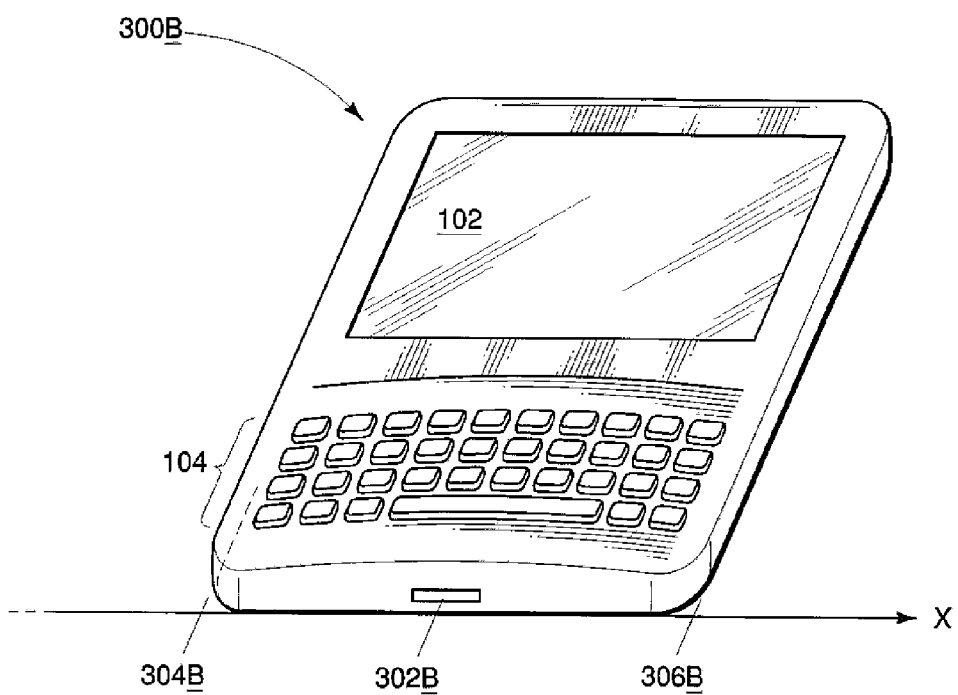

In various embodiments, the curved keyboard form factor is a convex curve. A convex curve is an outward curve. For instance, FIG. 3B illustrates a handheld device 300B where the key input portion 104 has a form factor that is convex. As discussed above, the form factor is convex with respect to a plane formed by two edges of a surface of the display portion 102. The two edges that form the plane may be the left and right edges of the display portion 102. The two edges may be linear and parallel to one another. However, in additional embodiments the two edges that form the plane may not be linear and/or parallel to one another.

In FIG. 3B, the surface of the display portion 102 remains flat, or substantially flat. Accordingly, given the view of the handheld device 300B, the center 302B of the key input portion 104 in the x-direction is elevated with respect to the left edge 304B and the right edge 306B, which are depressed in the z-direction.

Figure 4A:
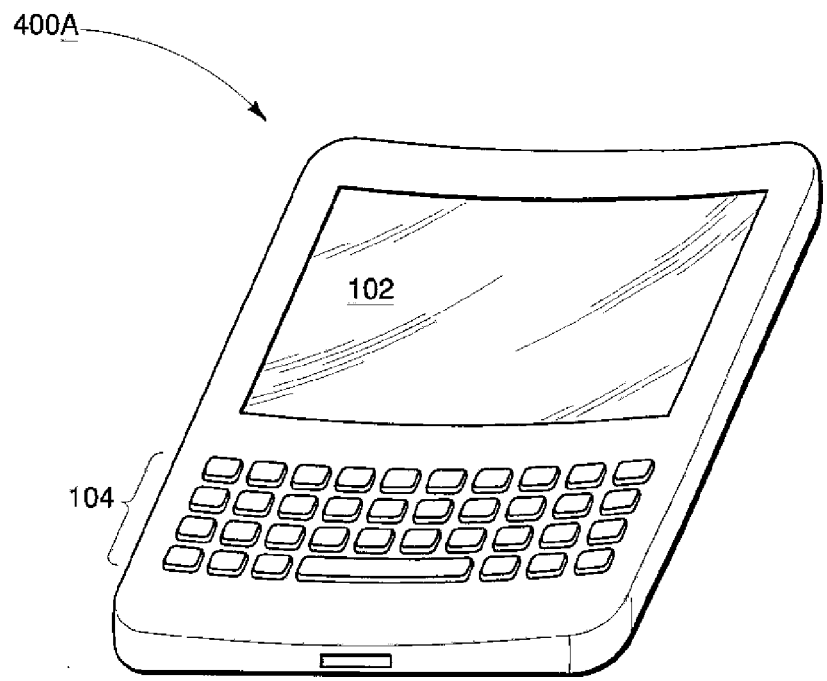
FIGS. 4A and 4B illustrate example handheld devices with key input form factors and display portions curved in a concave manner and a convex manner, in accordance with various embodiments.

In additional embodiments, the display portion 102 of a handheld device may also be curved in accordance with the key input form factors discussed with respect to FIGS. 3A and 3B. For example, FIG. 4A illustrates an embodiment where both the display portion 102 and the key input portion 104 of the handheld device 400A are formed in association with a concave curve. Moreover, due to the elevated edges of the handheld device, the concave curve provides an element of privacy for a user viewing the displayed input on the display portion 102.

Figure 4B:
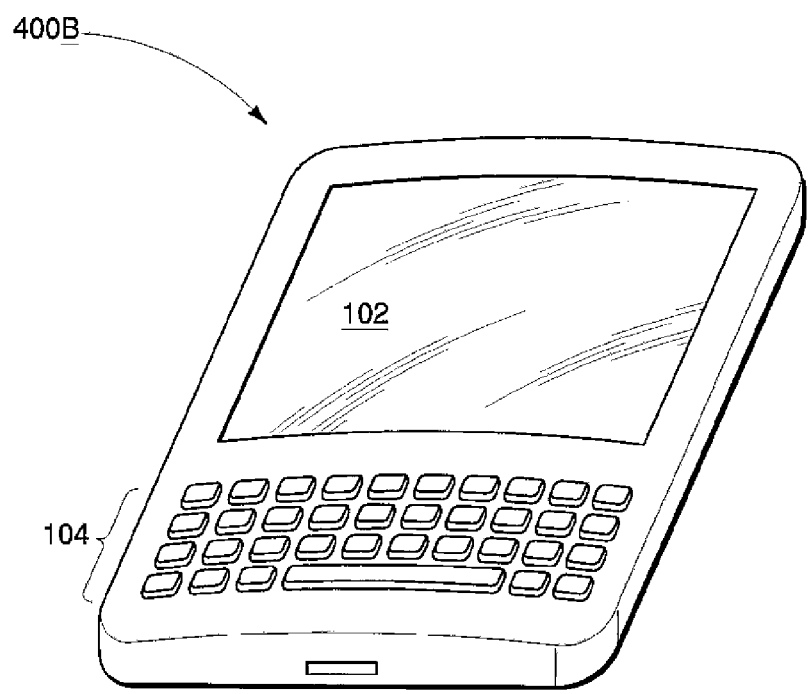

Similarly, FIG. 4B illustrates an embodiment where both the display portion 102 and the key input portion 104 of the handheld device 400B are formed in association with a convex curve. In both of FIGS. 4A and 4B, the left and right edges of the display portion 102 still form an imaginary plane even though the display portion surface is curved in accordance with the key input portion 104. The key input portion 104 is curved (i.e. concave and convex) with respect to this imaginary plane that the two edges form.

Figure 5A:
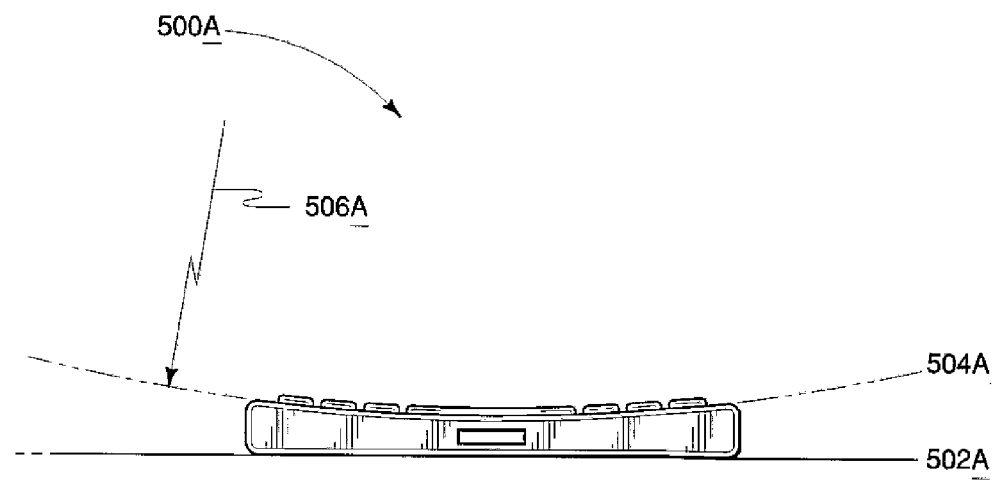
FIGS. 5A and 5B illustrate how to determine a concave arc for a curved key input form factor of a handheld device, in accordance with various embodiments.
Figure 5B:
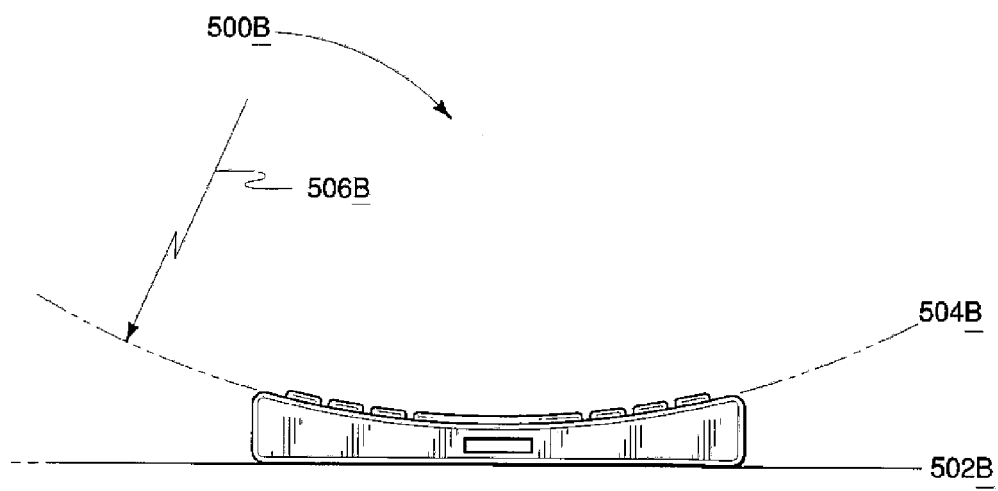

Determining an arc of a concave curve for a handheld device is discussed in accordance with FIGS. 5A and 5B. FIG. 5A illustrates a side view of the bottom of a handheld device 500A laying flat on a surface 502A. In at least one embodiment, an arc k 504A is defined by one over the radius r 506A of a circle associated with the arc k 504A, or $k=1/r$. Accordingly, the arrangements and techniques described herein utilize a circle with a measured radius r 506A to curve the key input form factor with an arc k that deviates, at least slightly, from a straight line (i.e. the plane formed by the two edges previously discussed).

As previously discussed, in various embodiments, the same arc or substantially same arc, may apply to the display portion 102 surface of the handheld device as well as the key input portion 104. Thus, the concave curve of a handheld device is determined by identifying a circle with an optimum radius r to achieve an arc k that permits an ease of use for the user of the handheld device.

FIG. 5B illustrates a steeper concave curve for a handheld device 500B compared to the concave curve illustrated in FIG. 5A. Again, a side view of the bottom of the handheld device 500B laying flat on a surface 502B is illustrated. In this example, an arc 504B is determined using a radius r 506B. Again, the arc illustrated in FIG. 5B provides a steeper concave curve of the handheld device 500B compared to curve illustrated in FIG. 5A.

Figure 6A:
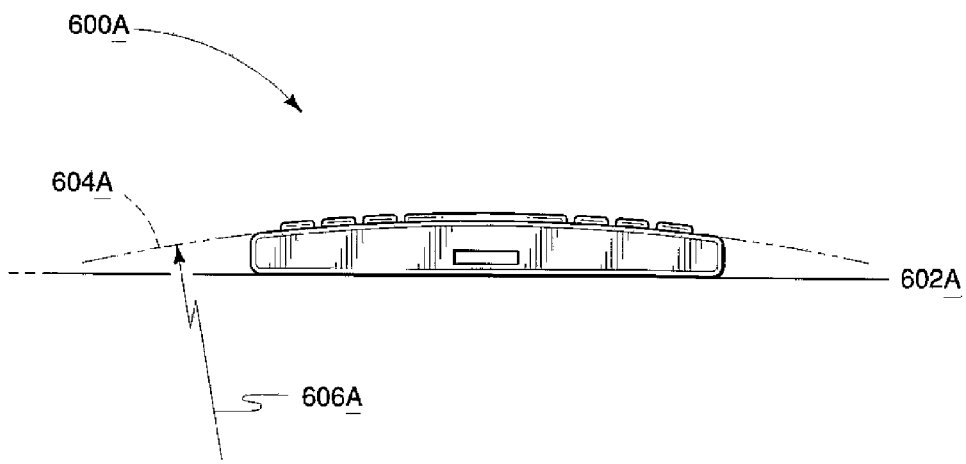
FIGS. 6A and 6B illustrate how to determine a convex arc for a curved key input form factor of a handheld device, in accordance with various embodiments.
Figure 6B:
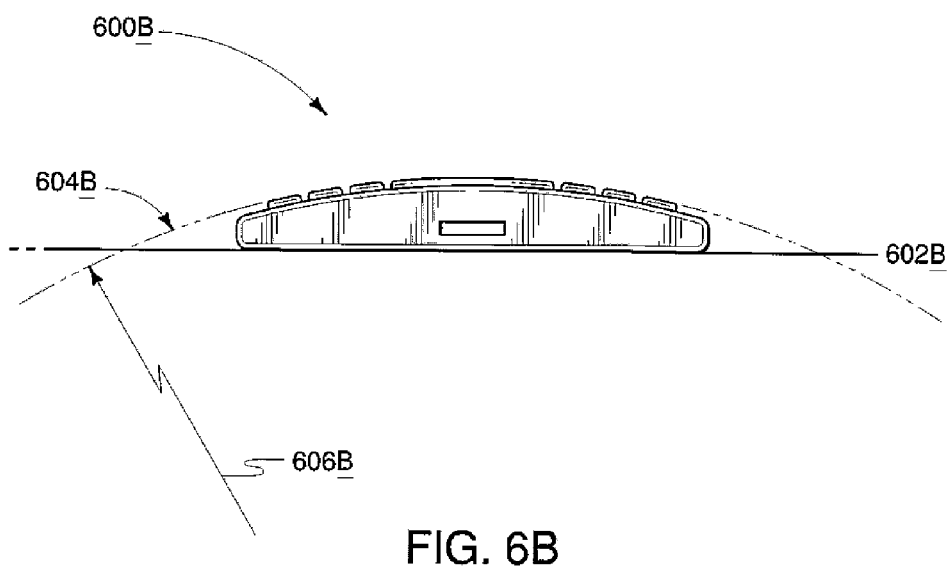

Determining the arc of a convex curve is discussed in accordance with FIGS. 6A and 6B. FIG. 6A illustrates a convex curve for a handheld device 600A. Again, a side view of the bottom of the handheld device 600A laying flat on a surface 602A is illustrated. In this example, an arc 604A is determined using a radius r 606A.

FIG. 6B illustrates a steeper convex curve for a handheld device 600B compared to the convex curve in FIG. 6A. Again, a side view of the bottom of the handheld device 600B laying flat on a surface 602B is illustrated. In this example, an arc 604B is determined using a radius r 606B.

FIGS. 5A-5B and 6A-6B are illustrated to provide an example that an optimal arc may vary in accordance with different circle radiuses (i.e. acceptable radius ranges). It is understood in the context of this document, that a circle radius identified to provide optimal arc may be dependent on the overall width of the handheld device, the overall width of the key input portion 104, the thickness of the handheld device, or any combination thereof. In at least one example, a circle radius of twenty centimeters (cm) provides an optimal arc k for a curved key input form factor (concave or convex) for a handheld device that has an overall width between 6.4 and 7.0 cm. Thus, the arc k is one over twenty, or $0.05$ $cm^{-1}$.

Accordingly, it is understood in the context of this document, that multiple factors may be considered when determining an optimal arc k for a particular handheld device. In various embodiments, the radius r of a circle used to determine the arc k of a concave or convex curve may be determined in accordance with a preset fraction of the overall width of the handheld device. For example, the radius r may be set to be one half, one third, one fourth, or one fifth of the width of the handheld device. In other embodiments, the radius r may be set to be two times, three times, four times, or five times the overall width of the handheld device.

It is noted that the arcs calculated for key input form factors of handheld devices are different compared to conventional ergonomic desktop keyboards by virtue of the substantial difference in size, or space available for key input. Moreover, the arcs are calculated in accordance with the fact that key input for handheld devices typically occurs via side access of one or two user thumbs while the handheld device is being grasped by one or two hands of a user.

Figure 7A:
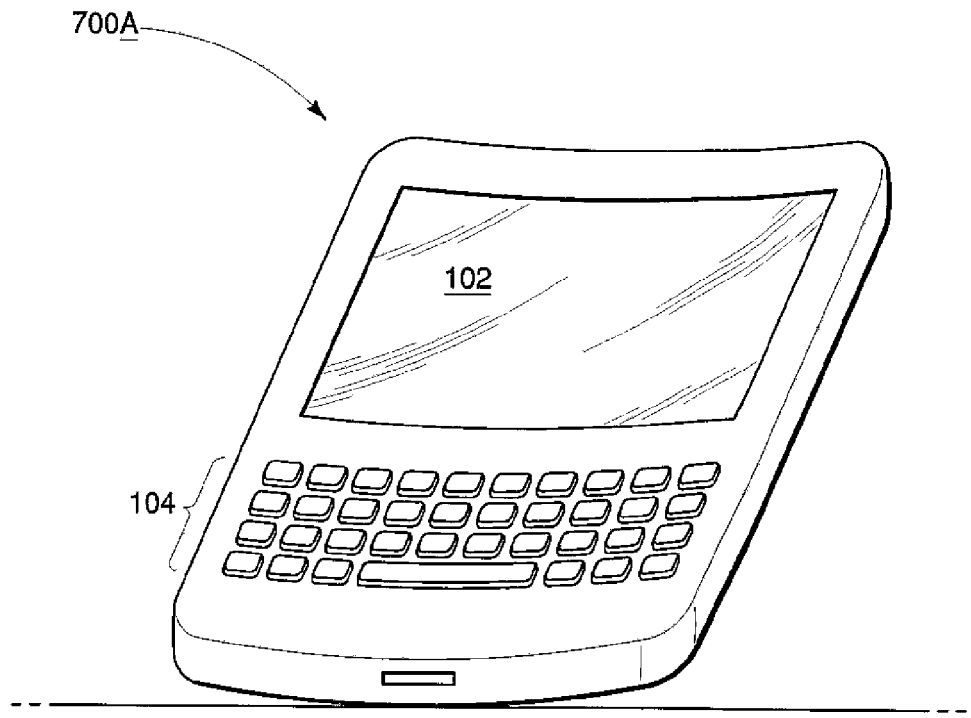
FIGS. 7A and 7B illustrate example handheld devices with back sides curved in a concave manner and a convex manner, in accordance with various embodiments.

In various embodiments, the back of the handheld device may also be curved in accordance with the key input form factor. For example, FIG. 7A illustrates that the back of handheld device 700A is curved in accordance with a concave form factor for the key input portion 104 and the display portion 102 configured on the front of the handheld device 700A. Again, due to the elevated edges of the handheld device, the concave curve provides an element of privacy for a user viewing the displayed input on the display portion 102.

Figure 7B:
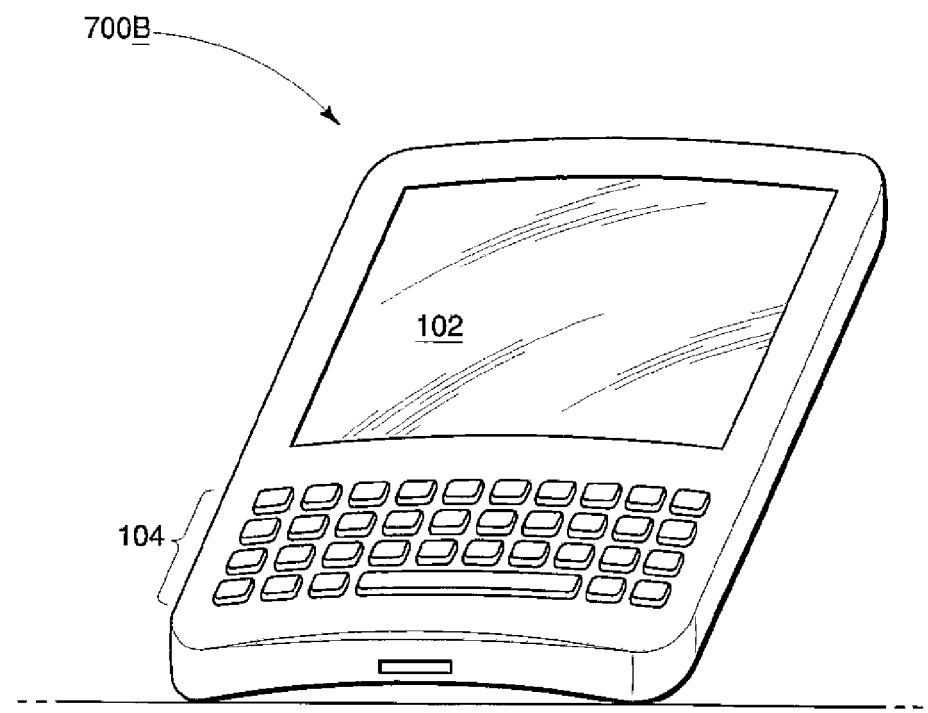

Similarly, FIG. 7B illustrates that the back of handheld device 700B is curved in accordance with a convex form factor for the key input portion 104 and the display portion 102 configured on the front of the handheld device 700B.

Figure 8:
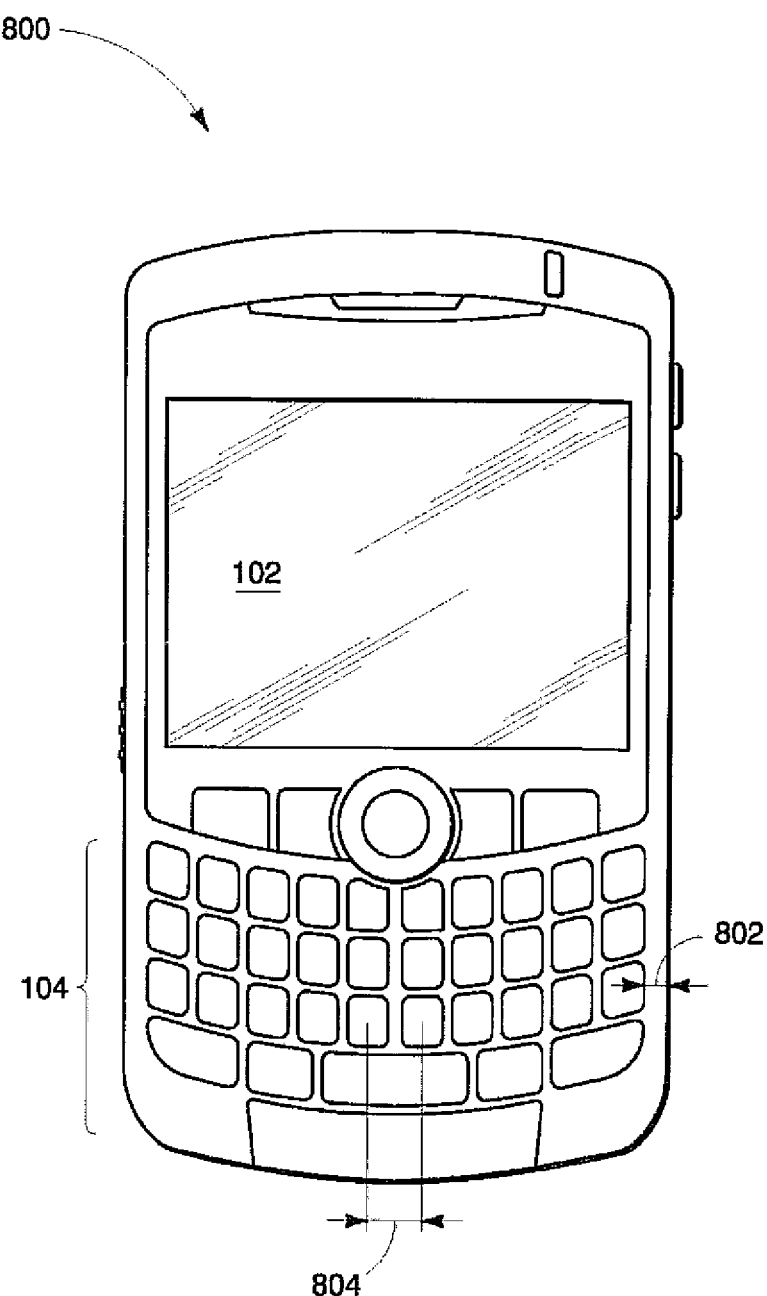
FIG. 8 illustrates an example handheld device that depicts shoulder space and key center-to-center spacing, in accordance with various embodiments.

FIG. 8 illustrates dimensions of the key input portion 104 for handheld device 800. The optimal dimensions further complement the ease of use provided by the concave form factors and the convex form factors as previously discussed. The distance between the edge of the key input portion 104 and the side edges of the handheld device 800 (i.e. left and right edges) is defined as the shoulder space 802. The distance between individual input keys configured in the key input portion 104 is defined as key center-to-center (c-to-c) width 804. Key c-to-c width 804 is the distance from the center of a first key to the center of a second adjacent key, and in various embodiments, is consistent across all the keys in the key input portion 104.

In accordance with tests conducted in association with the arrangements and techniques described herein, in various embodiments, a user is provided with a better key input experience when the shoulder space 802 for a "bar" handheld device (i.e. FIGS. 2A, 2D, and 2E with a portrait view) is within a range of 2.5 to 5 mm. In at least one embodiment, the optimal shoulder space 802 is set to 3 mm. Further, a user is provided with a better key input experience when the key c-to-c width 804 for the "bar" handheld device is within a range of 5.5 to 8 mm. In at least one embodiment, the optimal key c-to-c width 804 is set to 6 mm.

Moreover, when the handheld device is a "slide" handheld device (i.e. FIG. 2B with a landscape view), or a "bar" handheld device being used in landscape view mode, a user is provided with a better key input experience when the shoulder space 802 for a landscape view is within a range of 7 to 17 mm. In at least one embodiment, the optimal shoulder space 802 is set to 12 mm. Further, a user is provided with a better key input experience when the key c-to-c width 804 for a landscape view is within a range of 5.5 to 9 mm. In at least one embodiment, the optimal key c-to-c width 804 is set to 7.5 mm.

As illustrated in FIGS. 5A and 5B, the shoulder space 802 is included in the curve. However, in various embodiments, only the key input portion 104 may be curved, while the shoulder space remains flat.

Example Handheld Device

Figure 9:
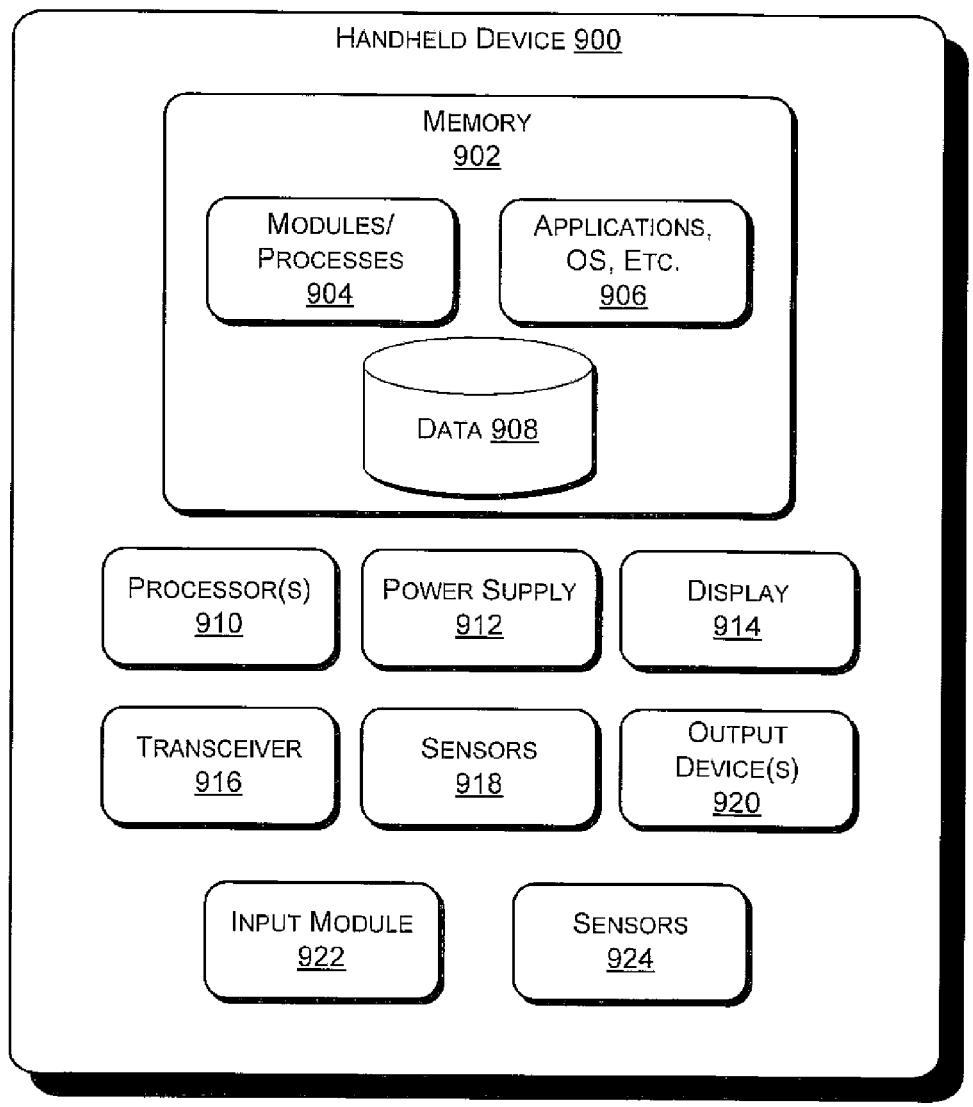
FIG. 9 illustrates a component level view of a telecommunication device, in accordance with various embodiments

FIG. 9 illustrates a component level view of an example handheld device, as commonly known in the field of art. As shown, the handheld device 900 may include a memory 902, the memory storing modules/processes 904, applications/OS 906, and data 908. The handheld device 900 may further include processor(s) 910, a power supply 912, a display module 914 associated with the display portion 102, a transceiver 916, sensors 918, output device(s) 920, input module 922 associated in part with the key input portion 104, and drive unit 924.

As commonly known in the art, the input module 922 is configured to receive key input from a user entered via the key input portion 104 of the handheld device, process the input and interact with the display module 914 to ensure appropriate data to be displayed is presented via the display portion 102 of the handheld device. Further discussion of the components illustrated in FIG. 9 will not be discussed in detail because they are well known to one of ordinary skill in the art.

Although the subject matter has been described in language specific to structural features, it is to be understood that the subject matter defined in the appended claims is not necessarily limited to the specific features described. Rather, the specific features are disclosed as exemplary forms of implementing the claims.

We claim:

1. A handheld device comprising:
   a planar display portion; and
   a key input portion adjacent to the planar display portion, the key input portion being curved in a direction that is substantially orthogonal to a plane formed by the planar display portion,
   wherein the curve of the key input portion is configured in association with an arc value determined using a radius of 20 centimeters,
   wherein a shoulder space between an edge of the key input portion and an edge of a casing of the handheld device is within a range of 2.5 to 5 millimeters, and
   wherein a key center-to-center width between adjacent keys of the key input portion is within a range of 5.5 to 8 millimeters.

2. The handheld device of claim 1 wherein the curve of the key input portion is a concave curve.

3. The handheld device of claim 1, wherein the curve of the key input portion is a convex curve.

* * * * *